United States Patent
Konji

(10) Patent No.: US 10,536,590 B2
(45) Date of Patent: Jan. 14, 2020

(54) DISPLAY CONTROL METHOD, DISPLAY CONTROL APPARATUS, AND STORAGE MEDIUM STORING DISPLAY CONTROL PROGRAM FOR DETERMINING DISPLAY ITEMS

(71) Applicant: CANON KABUSHIKI KAISHA, Tokyo (JP)

(72) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 15/208,364

(22) Filed: Jul. 12, 2016

(65) Prior Publication Data
US 2017/0019545 A1    Jan. 19, 2017

(30) Foreign Application Priority Data
Jul. 14, 2015    (JP) ................................ 2015-140580

(51) Int. Cl.
H04N 1/10    (2006.01)
H04N 1/00    (2006.01)
H04N 1/32    (2006.01)

(52) U.S. Cl.
CPC ..... H04N 1/00416 (2013.01); H04N 1/32122 (2013.01)

(58) Field of Classification Search
None
See application file for complete search history.

(56) References Cited

U.S. PATENT DOCUMENTS

| 2010/0053676 A1* | 3/2010 | Sugimoto | G06F 3/0238 358/1.15 |
| 2013/0111238 A1* | 5/2013 | Takahashi | H04N 1/00222 713/320 |
| 2013/0194631 A1* | 8/2013 | Anezaki | H04N 1/0035 358/1.15 |
| 2013/0208296 A1* | 8/2013 | Yoshida | G06K 15/02 358/1.14 |
| 2014/0362401 A1* | 12/2014 | Yamashita | H04N 1/00503 358/1.15 |
| 2015/0103376 A1* | 4/2015 | Saeda | G06F 3/1253 358/1.15 |

FOREIGN PATENT DOCUMENTS

| JP | H08-212044 A | 8/1996 |
| JP | 2013-097667 A | 5/2013 |
| JP | 2014-134868 A | 7/2014 |
| JP | 2014-239282 A | 12/2014 |

\* cited by examiner

*Primary Examiner* — Mohammad H Ghayour
*Assistant Examiner* — Pawan Dhingra
(74) *Attorney, Agent, or Firm* — Canon U.S.A., Inc., IP Division

(57) ABSTRACT

A display control apparatus transmits change information for changing display provided by a predetermined device included in data acquired by the display control apparatus to the predetermined device. In response to a predetermined response to the transmission of the change information, the display control apparatus displays, on its own display device, a predetermined screen corresponding to display provided by the predetermined device changed by the change information.

17 Claims, 16 Drawing Sheets

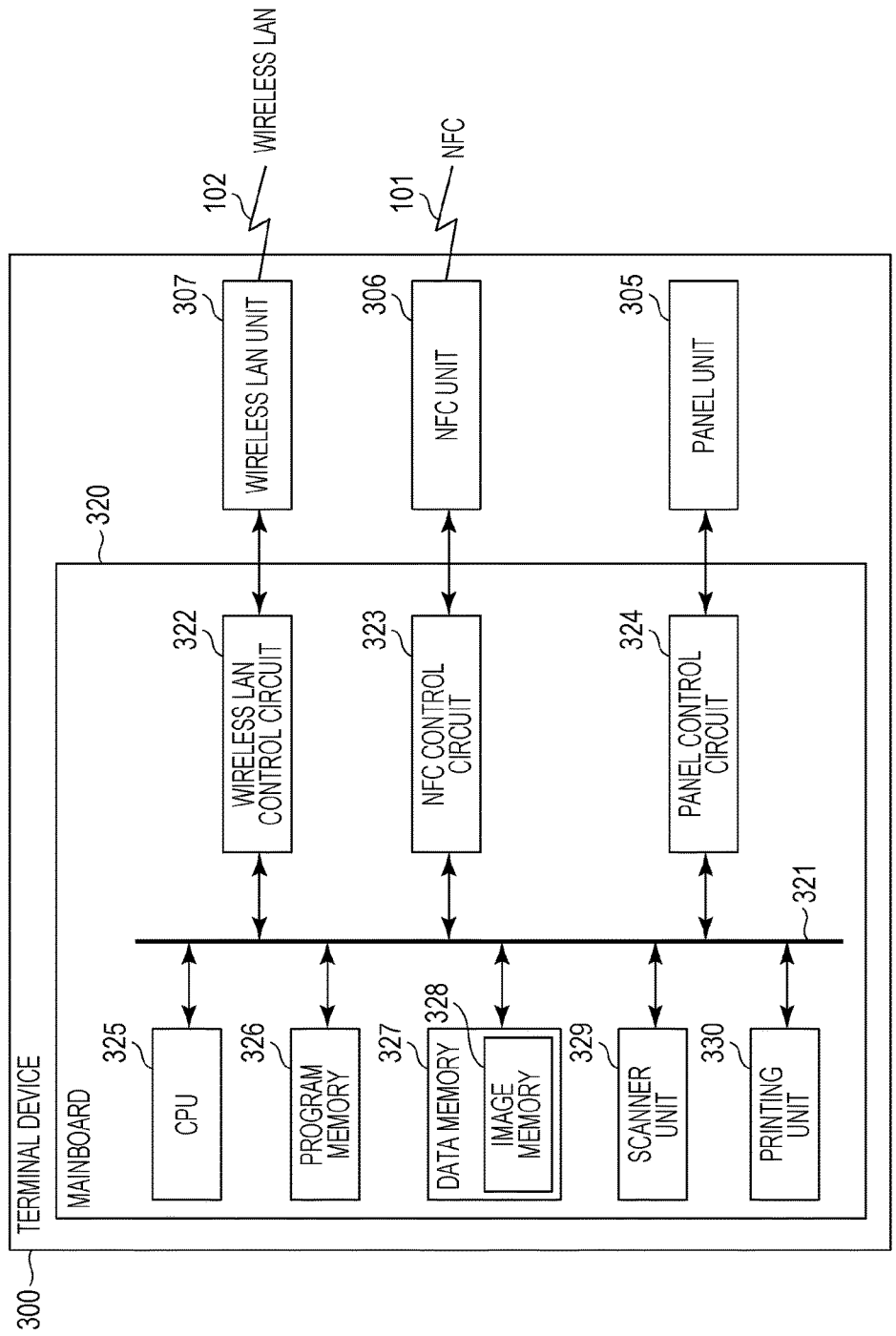

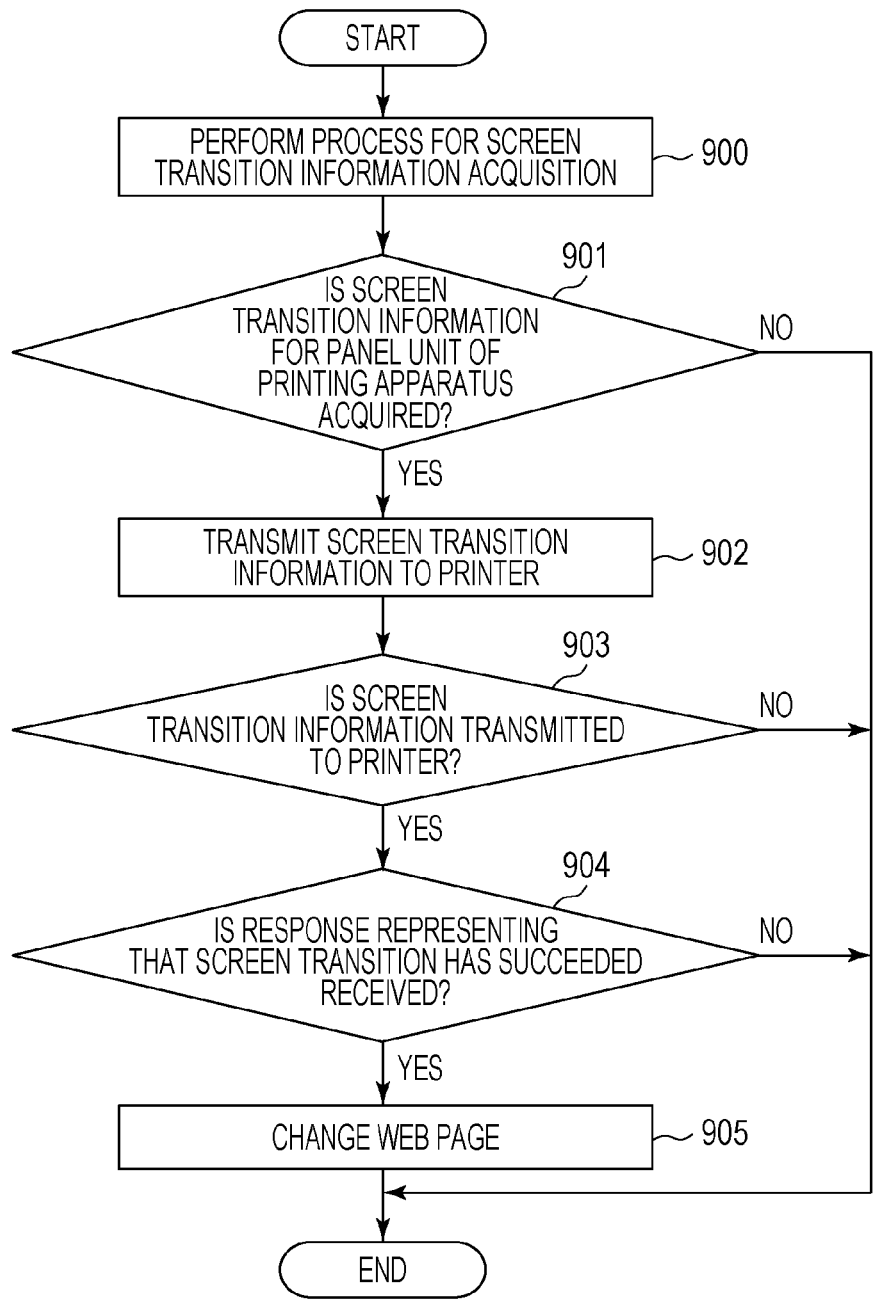

```
<?xml version="1.0" encoding="UTF-8"?>
<html>
<!--PrinterPanel:ROMversion --> ~1001
<body>

<font size="6">
CONFIRM ROM VERSION OF PRINTER<br>
</font>

<br><br>
FOLLOW THE PROCEDURE:<br>
<br>
1. CHECK THAT POWER SUPPLY OF PRINTER IS ON.<br>
<br>
2. FLICK PRINTER PANEL AND TAP [SETUP].<br>
   ⇒ HOW TO OPERATE PANEL<br>
<br>
3. TAP [PRINTER SETUP].<br>
<br>
4. FLICK PRINTER PANEL AND TAP [FIRMWARE UPDATE].<br>
<br>
5. FLICK PRINTER PANEL AND TAP [CONFIRM CURRENT VERSION].<br>
<br>
6. CONFIRM ROM VERSION ON PRINTER PANEL.<br>

</body>
</html>
```

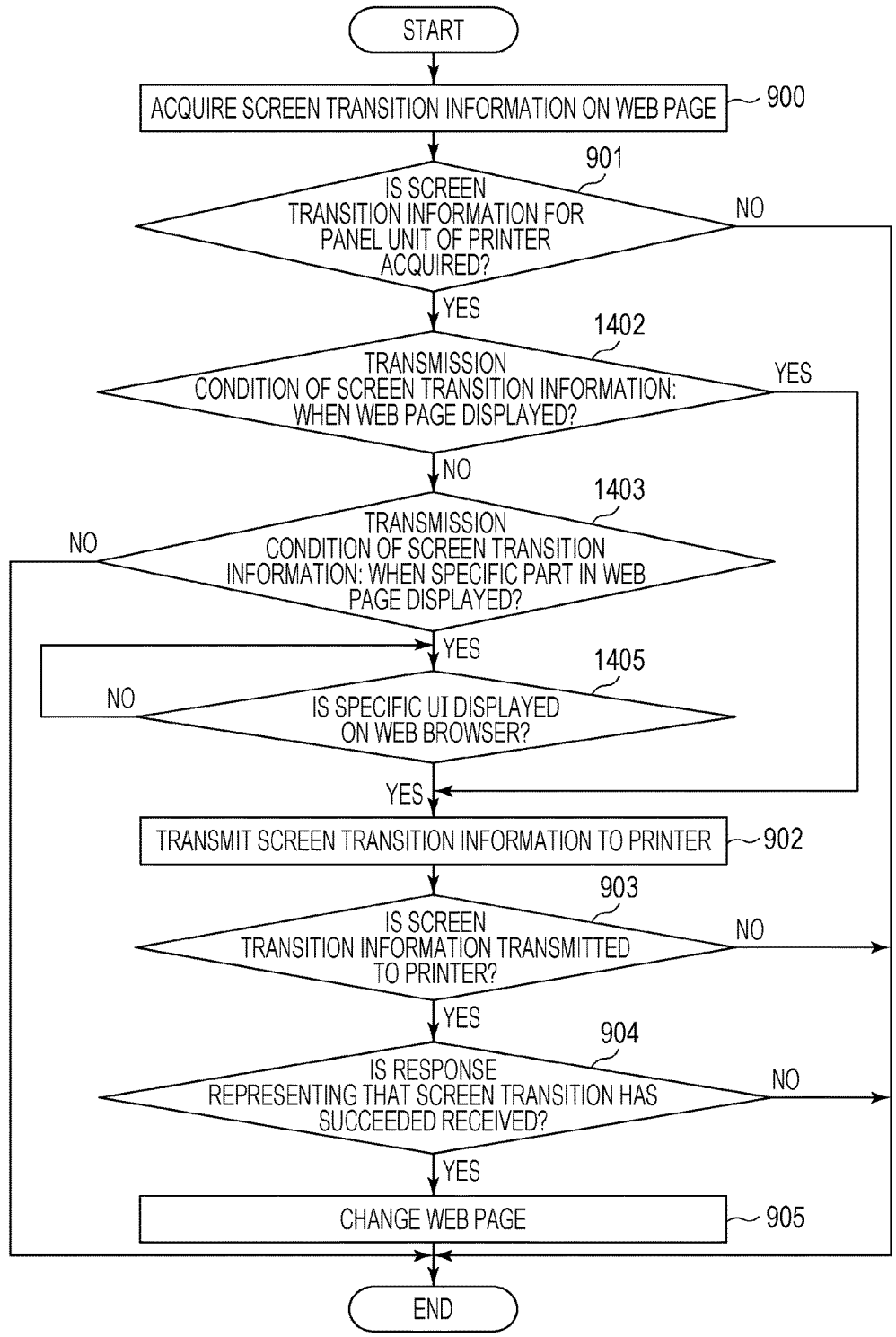

FIG. 14

```
<?xml version="1.0" encoding="UTF-8"?>
<html>
<body>

<font size="6">
CHECK INK CONDITION OF PRINTER<br>
</font>

<br><br>
FOLLOW THE PROCEDURE:<br>
<br>

...

<font size="6">
<!--PrinterPanel:ROMversion -->
CONFIRM ROM VERSION OF PRINTER<br>
</font>

<br><br>
FOLLOW THE PROCEDURE:<br>
<br>
1. CHECK THAT POWER SUPPLY OF PRINTER IS ON.<br>
<br>
2. FLICK PRINTER PANEL AND TAP [SETUP].<br>
   ⇒HOW TO OPERATE PANEL<br>
<br>
3. TAP [PRINTER SETUP].<br>
<br>
4. FLICK PRINTER PANEL AND TAP [FIRMWARE UPDATE].<br>
<br>
5. FLICK PRINTER PANEL AND TAP [CONFIRM CURRENT VERSION].<br>
<br>
6. CONFIRM ROM VERSION ON PRINTER PANEL.<br>

</body>
</html>
```

FIG. 15

```
<?xml version="1.0" encoding="UTF-8"?>
<html>
<!--WEB Browser:ROMversion -->
<body>

<font size="6">
CONFIRM ROM VERSION OF PRINTER<br>
</font>

<br><br>
FOLLOW THE PROCEDURE:<br>
<br>
1. CHECK THAT POWER SUPPLY OF PRINTER IS ON.<br>
<br>
2. FLICK PRINTER PANEL AND TAP [SETUP].<br>
    ⇒HOW TO OPERATE PANEL<br>
<br>
3. TAP [PRINTER SETUP].<br>
<br>
4. FLICK PRINTER PANEL AND TAP [FIRMWARE UPDATE].<br>
<br>
5. FLICK PRINTER PANEL AND TAP [CONFIRM CURRENT VERSION].<br>
<br>
6. CONFIRM ROM VERSION ON PRINTER PANEL.<br>

</body>
</html>
```

DISPLAY CONTROL METHOD, DISPLAY CONTROL APPARATUS, AND STORAGE MEDIUM STORING DISPLAY CONTROL PROGRAM FOR DETERMINING DISPLAY ITEMS

BACKGROUND OF THE INVENTION

Field of the Invention

The present invention relates to a display control method in a display control apparatus that includes a display device and is capable of communicating with a predetermined device, the display control apparatus, and a storage medium that stores a program executed in the display control apparatus.

Description of the Related Art

Multi-functional devices are proposed recently and various types of information are displayed on displays of these devices. Generally printing apparatuses, for example, are provided with a panel unit on which various types of information are displayed.

Portable terminals, such as smartphones, operate in cooperation with a printing apparatus. A technique of synchronizing displays of two apparatuses when these apparatuses operate in cooperation is proposed. Japanese Patent Laid-Open No. 8-212044 discloses a method for synchronizing screens of a main terminal and a sub-terminal in the following manner. When a user of the main terminal makes an instruction about a screen display, the main terminal writes information in accordance with the instruction in a common file, and the sub-terminal displays in accordance with the information read from the common file.

In the disclosed technique, the screen display of the sub-terminal is performed in accordance with the screen display of the main terminal. Therefore, if, for example, the main terminal makes the screen of the sub-terminal transition, the display of the main terminal is left unchanged. In this case, there is a case where the screen of the main terminal does not coincide with the screen of the sub-terminal after the screen transition.

SUMMARY OF THE INVENTION

The present invention provides a technique of, when a display control apparatus changes display provided by a predetermined device, making a screen corresponding to the change be displayed on a display device provided in the display control apparatus.

An aspect of the present invention is a display control program executed in a display control apparatus which includes a display device and is capable of communicating with a predetermined device. The program makes the display control apparatus perform transmitting change information for changing display provided by the predetermined device included in data acquired by the display control apparatus to the predetermined device from the display control apparatus, and displaying, in response to a predetermined response to the transmission of the change information in the transmission step, a predetermined screen corresponding to the display provided by the predetermined device changed by the change information on the display device provided in the display control apparatus.

Further features of the present invention will become apparent from the following description of exemplary embodiments with reference to the attached drawings.

BRIEF DESCRIPTION OF THE DRAWINGS

FIG. 6 is a block diagram illustrating a configuration of the printing apparatus.

FIG. 8 illustrates a process of a screen transition instruction program executed in a web browsing function of the print application in a first embodiment.

FIG. 9 illustrates exemplary HTML data of a manual page in the first embodiment.

FIG. 13 illustrates a process of a screen transition instruction program in a third embodiment.

FIG. 14 illustrates an exemplary HTML document in which display of a specific part in a web page is designated as a transmission condition of screen transition information.

FIG. 15 illustrates an exemplary HTML document for implementing a process of a fourth embodiment.

DESCRIPTION OF THE EMBODIMENTS

Hereafter, preferred embodiments of the present invention are described in detail with reference to the accompanying drawings. The embodiments are illustrative only and not limiting the invention related to the claims, and not all the combinations of the features described in the embodiments are necessary to solve the problems of the invention.

First Embodiment

Figure 1:
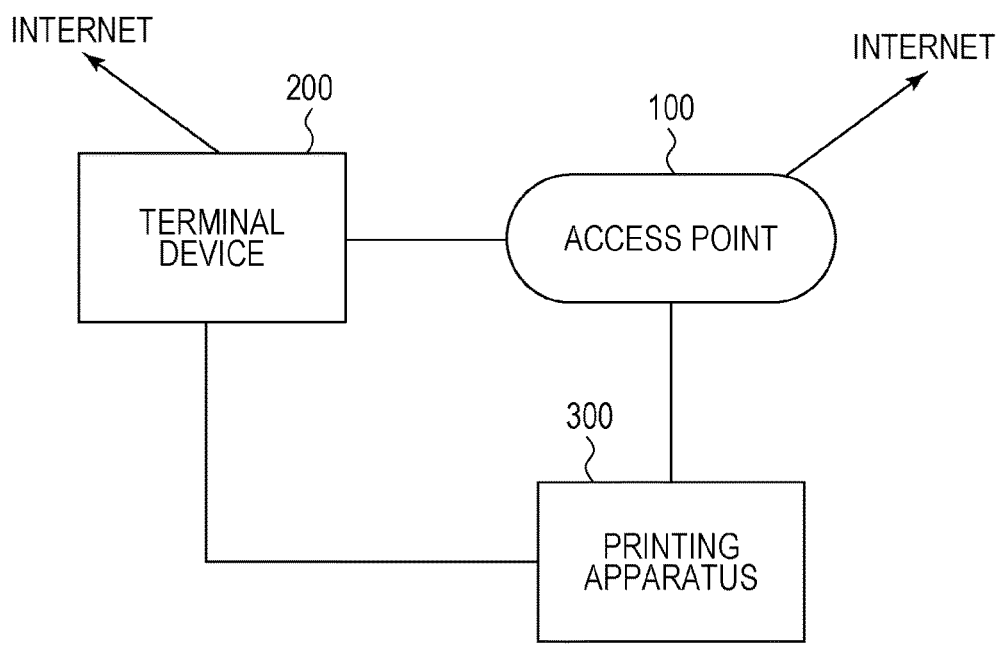
FIG. 1 illustrates an exemplary configuration of a print processing system.

FIG. 1 illustrates an exemplary configuration of a print processing system. This system includes an access point 100, a portable terminal device 200 and a printing apparatus 300 which are connectable with the access point 100. In the present embodiment, a terminal device 200 is described as an exemplary display control apparatus which makes other devices perform screen transition (change in display content). The terminal device 200 may be various devices, such as a personal information terminal (e.g., a personal digital assistant (PDA)), a smartphone, a mobile phone, a personal computer, and a digital camera. In the present embodiment, the printing apparatus 300 is described as an exemplary predetermined device which automatically performs screen transition. However, various devices, such as a PDA, a smartphone, a mobile phone, a personal computer, and a digital camera, may be used as the predetermined device instead of the printing apparatus 300.

The access point 100 is connectable with the Internet. The terminal device 200 is a communication apparatus which connects with a mobile phone network. The terminal device 200 connects with the Internet via the mobile phone network. The printing apparatus 300, which functions also as a communication apparatus, has a printing function of printing an image on a print medium using a print engine, such as inkjet printing. The printing apparatus 300 may also have a reading function of reading a document placed on a document table, a facsimile function, and a telephone function. The terminal device 200 and the printing apparatus 300 may be connected by wireless LAN in an infrastructure mode. The terminal device 200 and the printing apparatus 300 may communicate mutually by operating in the infrastructure mode, respectively. Specifically, the terminal device 200 and the printing apparatus 300 may communicate mutually via the external access point 100 by the wireless LAN. The printing apparatus 300 may have a hardware or software access point inside. Also in this case, the terminal device 200 may operate in an infrastructure mode and may communicate with the printing apparatus 300 via the access point provided in the printing apparatus 300. Each of the terminal device 200 and the printing apparatus 300 has a short-range wireless communication function, and the terminal device 200 and the printing apparatus 300 may communicate peer to peer (P2P) by the short-range wireless communication. The short-range wireless communication is performed in a relatively small prescribed range (e.g., 1 meter to several centimeters). Exemplary short-range wireless communication is near field communication (NFC). The wireless LAN described above has a wider communication range than that of the short-range wireless communication (e.g., NFC). As a communication method of which communication range is wider than that of the short-range wireless communication, Bluetooth (registered trademark) and Bluetooth Low Energy (BLE) may be used instead of the wireless LAN. BLE may be used instead of NFC as the short-range wireless communication.

Figure 2:
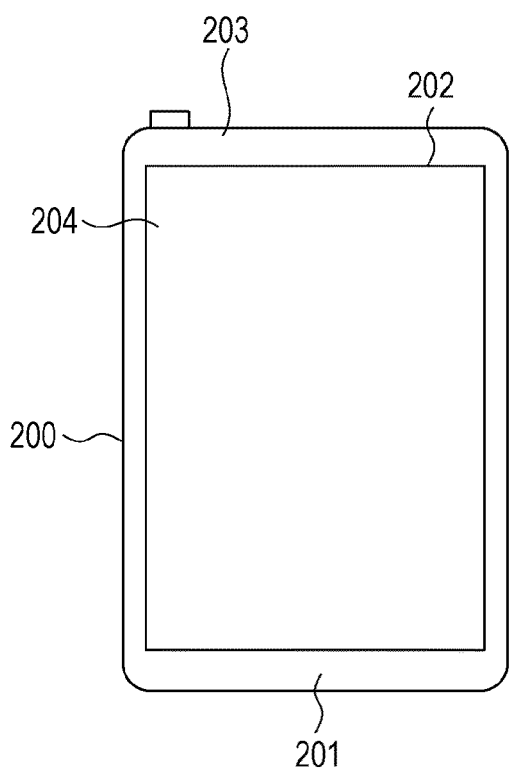
FIG. 2 illustrates an exterior of a terminal device.

FIG. 2 illustrates an exterior of the terminal device 200. In the present embodiment, the terminal device 200 is a smartphone. A smartphone is a multifunctional mobile phone having functions of a camera, a net browser, an e-mail, and the like in addition to the function of a mobile phone. An NFC unit 201 establishes communication by NFC as a short-range wireless communication. Communication may be established when a user brings the NFC unit 201 closer to a partner NFC unit (e.g., an NFC unit 306 of the printing apparatus 300 described later) within a predetermined distance (about 10 cm).

A wireless LAN unit 202 is used for wireless LAN communication, and is disposed in the terminal device 200. A line connection unit 203 is used for communication via the mobile phone network, and is disposed in the terminal device 200. The line connection unit 203 is connectable with the Internet via the mobile phone network. The mobile phone network is based on a communication standard, such as the long term evolution (LTE).

A panel unit 204 is, for example, a display device having a LCD display mechanism. The panel unit 204 has a touchpanel manipulation mechanism. When a user presses (touches) the panel unit 204, a panel control circuit 224 described later outputs information, including position, range, strength, etc., on the pressed panel unit 204 to a CPU 225 described later as pressing information of the user. For example, a user interface (UI), such as button icons and a software keyboard, are displayed on the panel unit 204. When the user presses the UI, the terminal device 200 performs a predetermined function corresponding to the pressed UI.

Figure 3A:
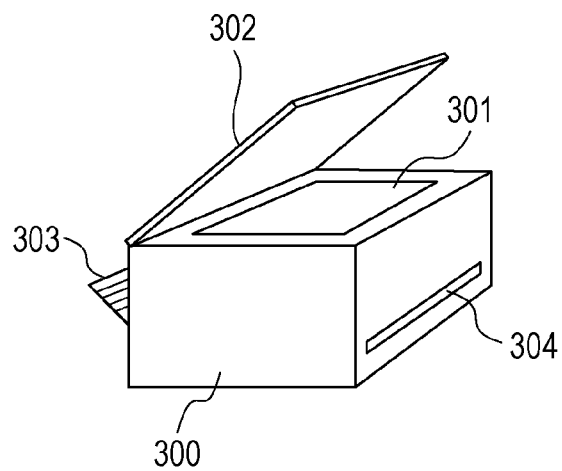
FIGS. 3A and 3B illustrate an exterior of a printing apparatus.
Figure 3B:
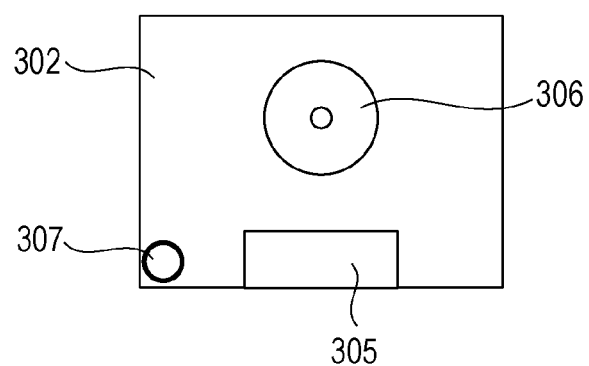

FIGS. 3A and 3B illustrate an exterior of the printing apparatus 300. In the present embodiment, a multi-function printer (MFP) having a reading function (a scanner) is described as the exemplary printing apparatus 300. In FIG. 3A, a document table 301 is a transparent glass table. A document placed thereon is read with the scanner. A document lid 302 prevents reading light of the scanner from leaking outside. A print sheet insertion port 303 is a port at which paper sheets of various sizes are set. The paper sheet set at the print sheet insertion port 303 is conveyed one at a time to a printing unit, and subject to printing, and discharged from a print sheet discharge port 304. As illustrated in FIG. 3B, a panel unit 305 and the NFC unit 306 are disposed above the document lid 302. The panel unit 305 is, for example, a display device having an LCD display mechanism. The panel unit 305 has a touchpanel manipulation mechanism and, when pressed (touched) by the user, pressing information is output as in the case of the panel unit 204 of the terminal device 200.

The NFC unit 306 is used for the communication by NFC as short-range wireless communication. The user places the terminal device 200 close to the printing apparatus 300 at the NFC unit 306. A predetermined distance (about 10 cm) from the NFC unit 306 is an effective contact range. An antenna for wireless LAN communication is embedded in the wireless LAN unit 307.

Figure 4:
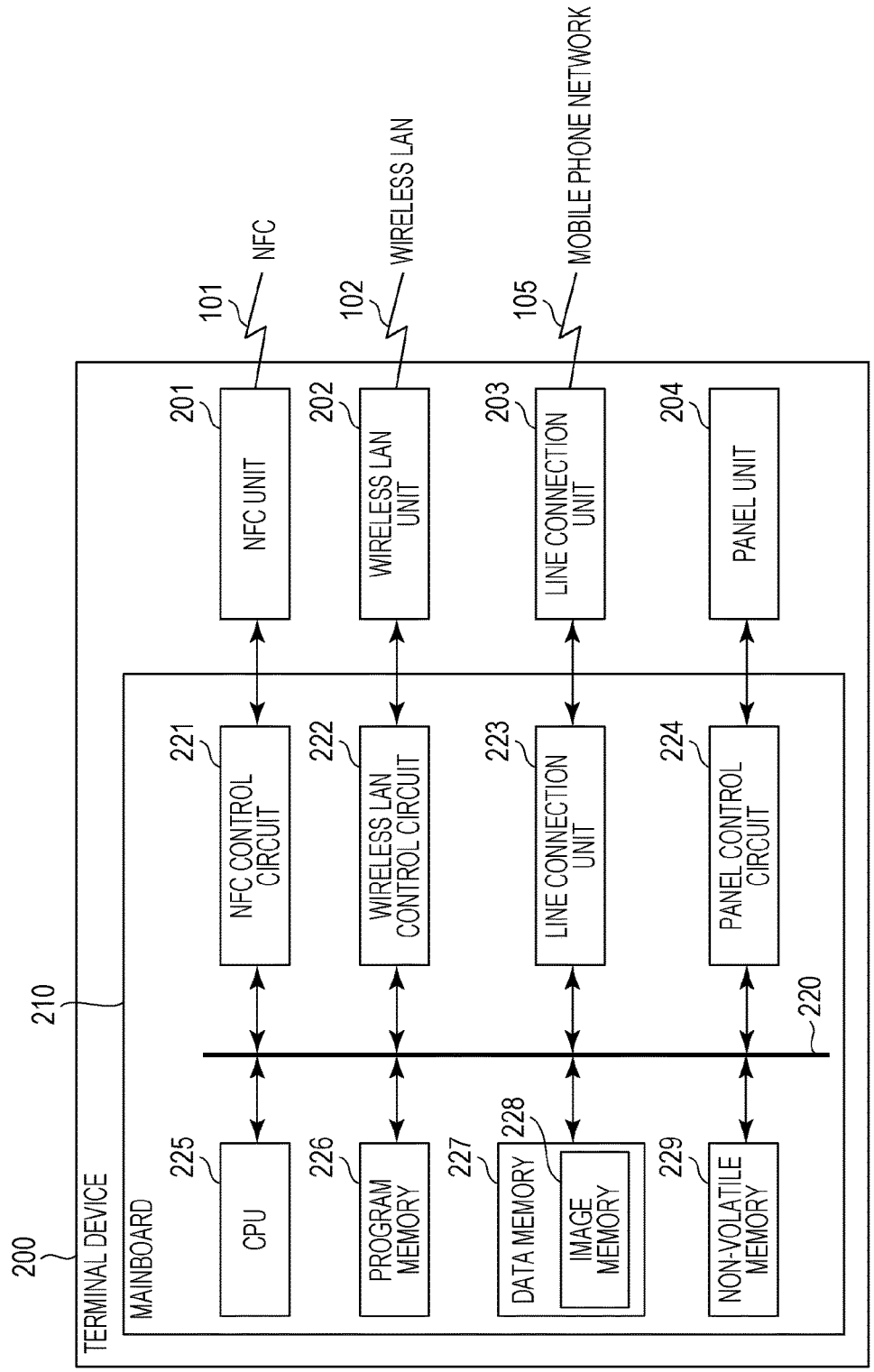
FIG. 4 is a block diagram illustrating an exemplary configuration of the terminal device.

FIG. 4 is a block diagram illustrating an exemplary configuration of the terminal device 200. The terminal device 200 includes a mainboard 210 which controls the entire apparatus, the NFC unit 201, the wireless LAN unit 202, the line connection unit 203, and the panel unit 204. All of the NFC unit 201, the wireless LAN unit 202, and the line connection unit 203 function as communication units of the terminal device 200. The CPU 225 in the form of a microprocessor disposed in the mainboard 210 controls the entire terminal device 200. Specifically, the CPU 225 operates in accordance with a control program stored in program memory 226 in the form of ROM connected via an internal bus 220, and the content of data memory 227 in the form of RAM. For example, the CPU 225 may control the wireless LAN unit 202 via the wireless LAN control circuit 222 to communicate with other communication terminal devices by wireless LAN 102. Further, the CPU 225 may control the NFC unit 201 via an NFC control circuit 221 to detect a connection by an NFC 101 with other NFC terminals and transmit and receive data to and from other NFC terminals. The CPU 225 may control the line connection unit 203 via the line control circuit 223 to connect to a mobile phone network 105 for telephone calls and data transmission and reception. The CPU 225 may control the panel control circuit 224 to make various types of information, including the UI, be displayed on the panel unit 204. The CPU 225 may input pressing information output from the panel control circuit 224 by the user manipulation to the panel unit 204, and may perform processes based on the pressing information. Non-volatile memory 229 consists of memory, such as flash memory, and stores data to save after the power is turned off. In the non-volatile memory 229, telephone directory data, various types of communication connection information, device information connected in the past, image data to save, a program of, for example, an application software that implements various functions to the terminal device 200, and the like are stored. In the program memory 226, for example, a print application that makes the printing apparatus 300 perform the printing process and the like, and an operating system (OS) are stored. The CPU 225 reads the print application from the program memory 226 on the data memory 227, and executes the read application on the OS. Then the UI of the print application may be displayed on the panel unit 204 via the panel control circuit 224.

Figure 5A:
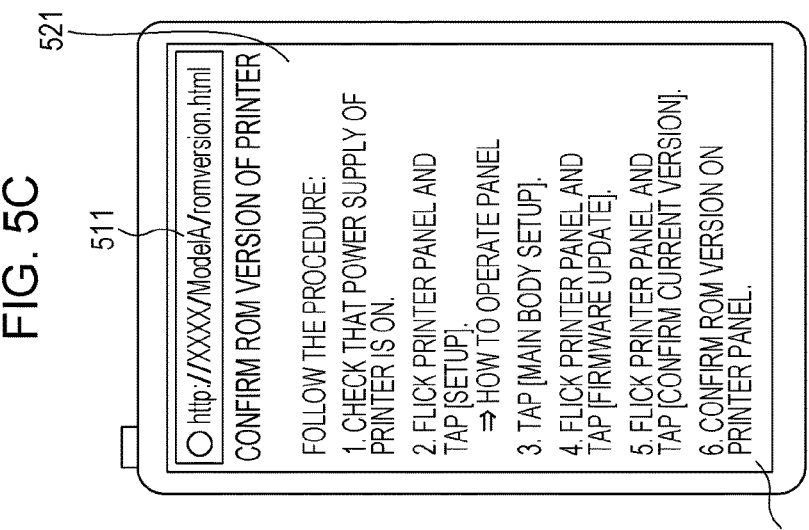
FIGS. 5A-5C illustrate an exemplary screen provided by a print application.
Figure 5B:
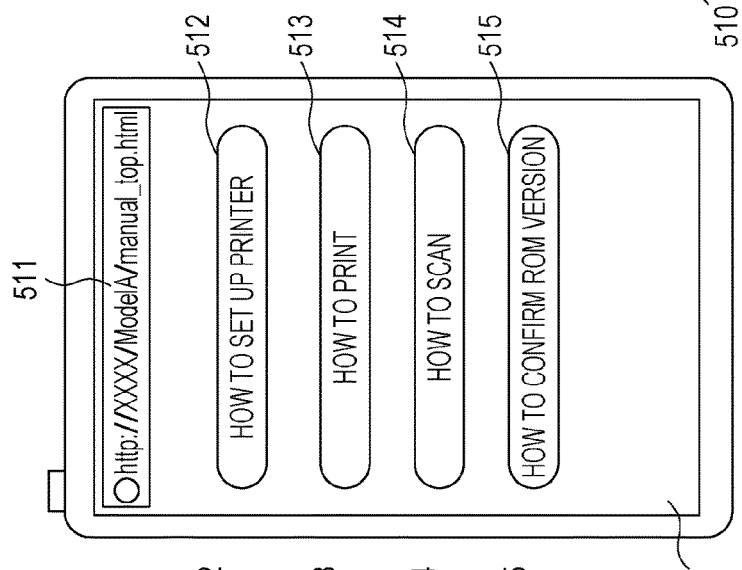
Figure 5C:
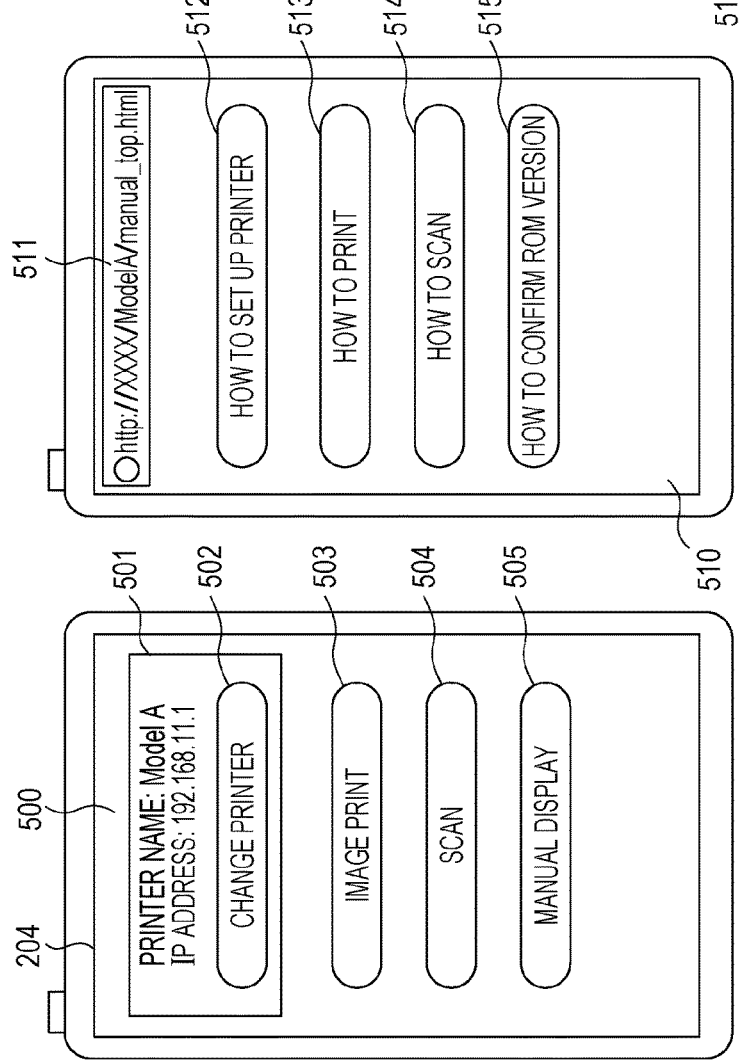

FIGS. 5A to 5C illustrate an exemplary screen 500 provided by the print application. The print application may hold specifying information specifying at least one printing apparatus and printing apparatus information representing, for example, performance of the printing apparatus. A printer of which specifying information and the printing apparatus information are held is referred to as a registration printer. In FIG. 5A, a part of the printing apparatus information of a target printer (a current printer) which executes various functions of the print application among the registration printers is displayed as current printer information 501. The current printer is the printing apparatus 300 herein. When the user selects a printer change button 502 via the panel unit 204, the current printer may be selected from the history of the printing apparatus registered in the past. The user may issue a search instruction of a printer if needed. When a search instruction is issued, the CPU 225 may search other printing apparatuses connected to the wireless LAN 102 by executing the print application and the OS to set the searched printing apparatus to be a registration printer or a current printer. When the user selects an image print button 503 via the panel unit 204, the CPU 225 makes the images in image memory 228 or the non-volatile memory 229 be displayed as a list on the panel unit 204, and lets the user select images to print. Regarding the selected print image group, the CPU 225 executes the print application and makes the printing apparatus 300 connected by the wireless LAN 102 via the wireless LAN unit 202 print the images. Similarly, when the user presses a scan button 504 via the panel unit 204, the CPU 225 makes the printing apparatus 300 connected by the wireless LAN 102 via the wireless LAN unit 202 scan the images. The scanned images are received by the wireless LAN unit 202 via the wireless LAN 102, and stored as an image file in the non-volatile memory 229 of the terminal device 200 by the CPU 225 using the print application.

When the user selects a manual display button 505 via the panel unit 204, the CPU 225 displays a manual of the current printer using a web browsing function of the print application. Specifically, the CPU 225 generates a URL as access information for accessing the web manual based on the printing apparatus information of the current printer. The CPU 225 connects to the Internet by the web browsing function via a communication unit (e.g., the line connection unit 203) which is connected with the Internet. The CPU 225 acquires a resource (e.g., HTML data) by communicating with a server in accordance with the generated URL and stores the resource in the data memory 227. The CPU 225 acquires the stored resource by the web browsing function, performs syntax analysis, and displays a manual of the current printer by the print application. Although the manual is acquired via the Internet in the present embodiment, the acquisition method is not limited to the same. The manual may be stored in advance in, for example, the data memory 227 or the non-volatile memory 229 of the terminal device 200.

FIG. 5B is exemplary display of the manual of the current printer displayed by the CPU 225 using the web browsing function of the print application. The screen displayed by the web browsing function is divided into a manual display area 510 and a URL display area 511. An URL of the manual generated by the web browsing function of the print application is displayed in the URL display area 511. If the manual is acquired by redirection on the server side, the generated URL and the URL to be displayed are not necessarily the same. Various description upon using the current printer by the user is displayed in the manual display area 510. In the example of FIG. 5B, link buttons are provided corresponding to methods of how to setup the printer 512, how to print 513, how to scan 514, and how to confirm the ROM version of the printer 515. When the user selects each of the link buttons, the CPU 225 accesses the corresponding URL page by the web browsing function of the print application, and displays by the web browser.

FIG. 5C is an example in which the link button of how to confirm the ROM version of the current printer 515 is pressed, and the web page for ROM version confirmation is displayed. In the URL display area 511, the URL of the web page of which version confirmation is described is displayed. A procedure for confirming the ROM version of the current printer is described in confirmation of ROM version 521. In the present embodiment, a confirmation method on the panel unit 305 of the printing apparatus 300 is displayed.

As illustrated in FIGS. 5A to 5C, the UI provided by the print application is displayed on the panel unit 204, and a desired manual is displayed on the panel unit 204 by the web browsing function in response to an instruction by the user on the UI. With this configuration, while operating, for example, the terminal device 200 and the printing apparatus 300, the user may read the manual about the currently using function or a function to be used by instructing in the terminal device 200.

FIG. 6 is a block diagram illustrating a configuration of the printing apparatus 300. The printing apparatus 300 includes a mainboard 320 which controls the entire apparatus, the NFC unit 306, the wireless LAN unit 307, and the panel unit 305. The NFC unit 306 and the wireless LAN unit 307 function as communication units of the printing apparatus 300. A CPU 325 in the form of a microprocessor disposed in the mainboard 320 operates in accordance with a control program stored in program memory 326 in the form of ROM connected via an internal bus 331, and the content of data memory 327 in the form of RAM. The CPU 325 controls a scanner unit 329 to read a document, and stores image data of the read document in image memory 328 of the data memory 327. The CPU 325 may control a printing unit 330 to print the image stored in the image memory 328 of the data memory 327 to a print medium. The CPU 325 controls the wireless LAN unit 307 via a wireless LAN control circuit 322 to communicate with other communication terminal devices by the wireless LAN 102. The CPU 325 may control the NFC unit 306 via an NFC control circuit 323 to detect a connection by an NFC 101 with other NFC terminals and transmit and receive data to and from other NFC terminals. The CPU 325 may execute applications in the program memory 326, and implement functions of the applications. For example, the CPU 325 may make conditions of the printing apparatus 300 and a function selection menu be displayed on the panel unit 305 via the panel control circuit 324. The CPU 325 may also receive a user instruction based on the user operations to the panel unit 305. The CPU 325 performs a management application stored in the program memory 326 for managing the printing apparatus 300, and makes a UI of the management application be displayed on the panel unit 305 via the panel control circuit 324.

Figure 7A:
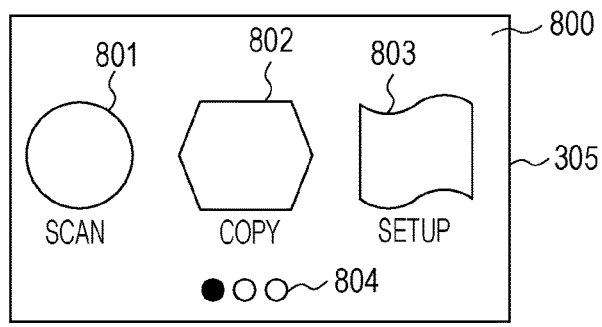
FIGS. 7A-7E illustrate exemplary screens displayed on a panel unit of the printing apparatus and provided by a management application.

FIGS. 7A to 7E each illustrate an exemplary screen provided by the management application and displayed on the panel unit 305 of the printing apparatus 300. FIG. 7A is an exemplary home screen UI provided by the management application. In the screen illustrated in FIG. 7A, a scan button 801, a copy button 802, a setup button 803, and a current page mark 804 are included.

Figure 7B:
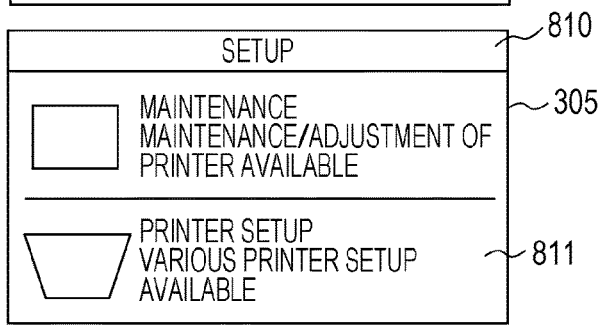
Figure 7C:
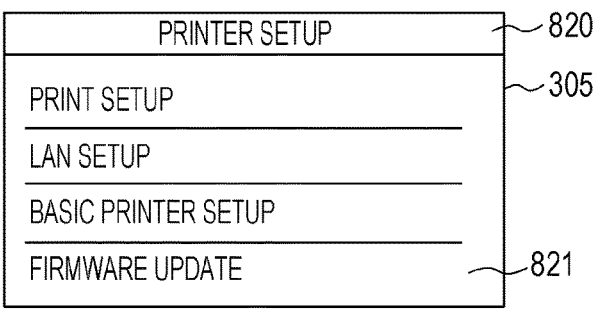
Figure 7D:
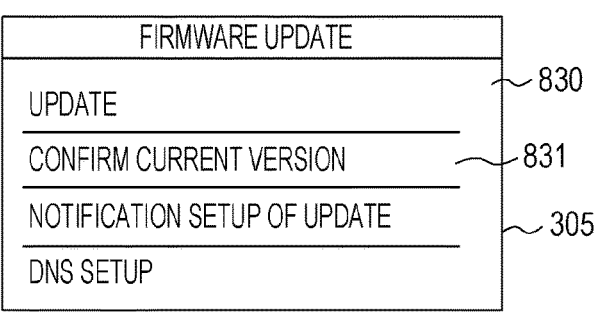
Figure 7E:
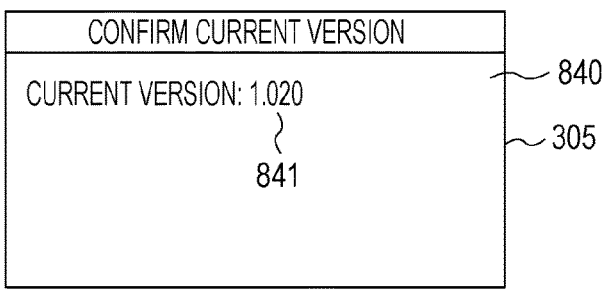

When the user selects the scan button 801 via the panel unit 305, the scanner unit 329 reads (scans) the document. Then a scanning setup UI (not illustrated) for saving image data (scanned image) of the read document in the image memory 328 is displayed. When the user selects the copy button 802, the scanner unit 329 scans the document and the CPU 325 saves the scanned image in the image memory 328. Then a copy setup UI (not illustrated) for printing the saved image in the printing unit 330 is displayed. If the user selects the setup button 803, a display setup screen 810 for setting up the printing apparatus 300 is displayed as illustrated in FIG. 7B. A current page mark 804 in FIG. 7A indicates the current page. In the example of FIG. 7A, the current page mark 804 indicates that the leftmost page is displayed. In the following page, buttons different from the scan button 801, the copy button 802, and the setup button 803 are disposed. To make a screen transition to other screens, the user may drag on the panel unit 305 from the right to the left.

FIGS. 7B to 7E illustrate exemplary screen transition since the user selects the setup button 803 via the panel unit 305 until the ROM version of the printing apparatus 300 is checked. In the present embodiment, the user selects the setup button 803 on a home screen 800 and the screen transitions to the setup screen 810 (change in display content). When the user selects a printer setting button 811 on the setup screen 810, the screen transitions to a printer setting screen 820 illustrated in FIG. 7C. When the user selects a firmware update button 821 of the printer setting screen 820, the screen transitions to a firmware update screen 830 illustrated in FIG. 7D. When the user selects a current version confirmation button 831 on the firmware update screen 830, the screen transitions to a current version confirmation screen 840 illustrated in FIG. 7E. The current version confirmation screen 840 includes version information 841 and a return button 842. In the version information 841, ROM version of the printing apparatus is displayed numerically.

FIG. 8 illustrates a process of a screen transition instruction program executed in the web browsing function of the print application in the first embodiment. The process illustrated in FIG. 8 is performed after any of the buttons 512 to 515 is selected by the user in the screen illustrated in FIG. 5B provided by the print application and the CPU 225 acquires a document which supports a web page (e.g., an HTML document). Specifically, the process illustrated in FIG. 8 is performed when the CPU 225 executes, on the data memory 227, a screen transition instruction program which is a part of the print application stored in the program memory 226. Here, a case where the user selects the button of how to confirm the ROM version 515 in FIG. 5B, and a manual page of the method for confirming the ROM version of the printer illustrated in FIGS. 10A to 10C is displayed is described.

Figure 10A:
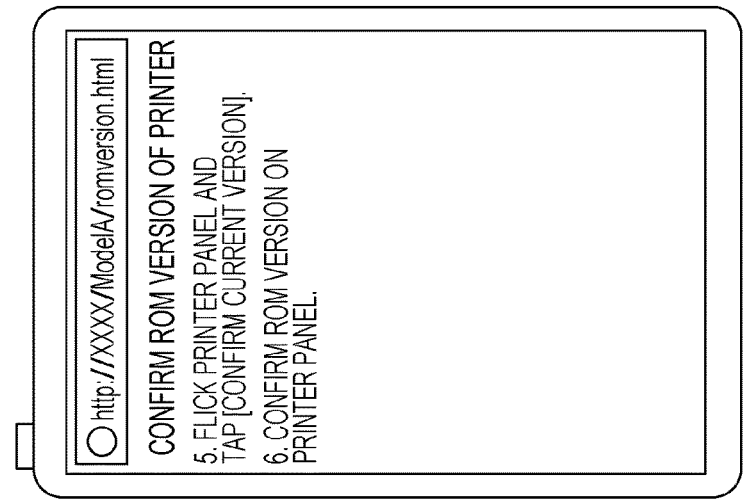
FIGS. 10A-10C illustrate display of a terminal device when the terminal device performs screen transition automatically under the screen transition instruction program.
Figure 10B:
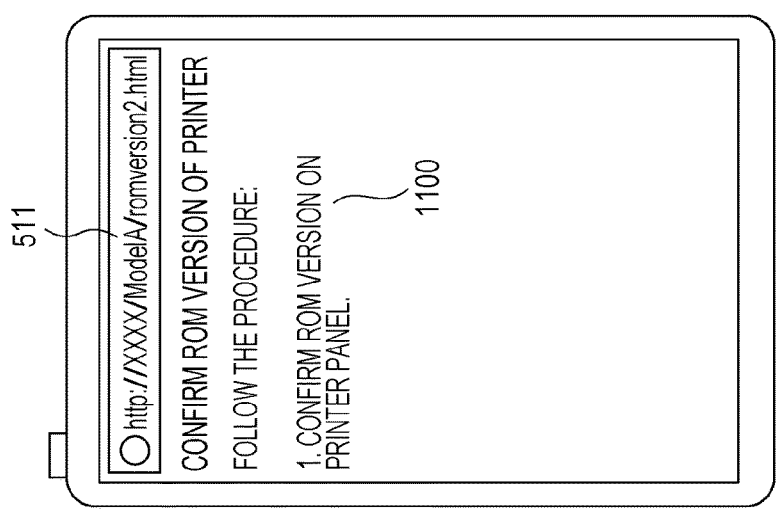
Figure 10C:
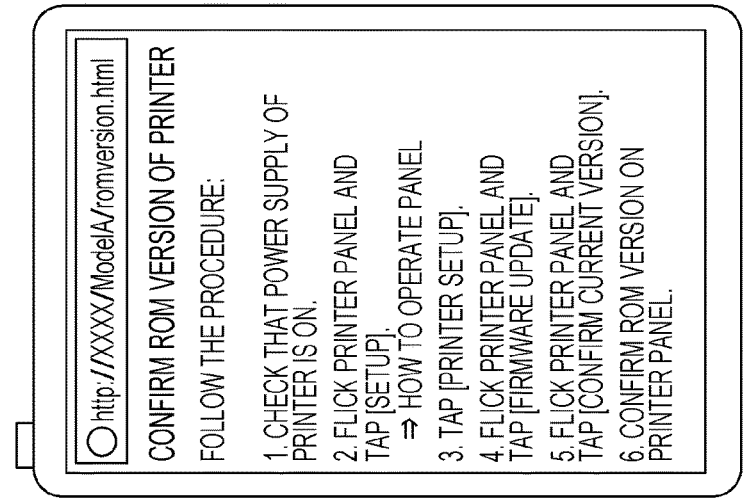

As illustrated in FIG. 10A, the web page for describing the confirmation method of the ROM version of the printer is related to the display and operation on the panel unit 305 of the printing apparatus 300. Specifically, the web page is a manual used to display the current version confirmation screen 840 on the panel unit 305. For example, the current version confirmation screen 840 may be displayed when the user performs the procedure steps 1 to 5 illustrated in FIG. 10A on the panel unit 305 of the printing apparatus 300 while checking the panel unit 204 of the terminal device 200. However, the user may view the current version confirmation screen 840 easily if the current version confirmation screen 840 is displayed immediately in response that the user presses the link button 515 in FIG. 5B which is an instruction to display the screen of FIG. 10A. Then a process for making the printing apparatus 300 display the current version confirmation screen 840 on the panel unit 305 automatically in response that the user presses the link button 515 in FIG. 5B is described with reference to FIG. 8.

In step 900, a process for acquiring web page screen transition information (change information for changing display content of other devices) is performed when the CPU 225 executes the screen transition instruction program. Specifically, the CPU 225 analyzes HTML data of the manual page of the web page, and performs the process for acquiring the screen transition information (the change information) on the panel unit 305 of the printing apparatus 300.

The screen transition information (the change information) represents the web page (HTML) currently displayed on the terminal device 200. The apparatus which received the screen transition information (e.g., the printing apparatus 300) displays a screen corresponding to the web page represented by the screen transition information. Specifically, if the screen is displayed using information stored in internal memory (e.g., the program memory 326) of the apparatus (e.g., the printing apparatus 300), the apparatus displays the screen by reading display data corresponding to the screen transition information from the internal memory. For example, the screens illustrated in FIGS. 7A to 7E are displayed by the management application stored in the program memory 326. If the apparatus has access to the Internet, the apparatus displays the screen by reading a URL corresponding to the screen transition information from the internal memory, and accessing the URL. The screen transition information may include a URL corresponding to the web page represented by the terminal device 200. In this case, the apparatus which receives the screen transition information displays the screen by accessing the URL included in the screen transition information. The URL included in the screen transition information may be of the web page represented by the terminal device 200 or may be of another web page.

FIG. 9 illustrates exemplary HTML data of the manual page in the first embodiment. In step 900, the CPU 225 searches a specific character string corresponding to the screen transition information in HTML data 1000. In FIG. 9, a keyword "PrinterPanel" which means screen transition to the panel unit 305 of the printing apparatus 300 is searched. "ROMversion" 1001 described after the keyword is the screen transition information.

Although the screen transition information is described in the HTML data in the foregoing example, this is not restrictive. For example, information about transition destination may be added to the URL of the web page, and the screen transition information may be acquired when the web browsing function of the terminal device 200 analyzes the URL.

When the process for acquiring the screen transition information is performed in step 900, the CPU 225 checks in step 901 whether the screen transition information to the panel unit 305 of the printing apparatus 300 is acquired by the process in step 900. If the screen transition information is not acquired, the CPU 225 terminates the screen transition instruction program. If the screen transition information is acquired, the process proceeds to step 902.

In step 902, the CPU 225 transmits the screen transition information to the printing apparatus 300. In the present embodiment, the CPU 225 transmits the screen transition information to the current printer of the print application described above by the wireless LAN unit 202. In step 903, the CPU 225 checks whether the screen transition information is transmitted successfully in step 902. Specifically, the CPU 225 checks whether a session of network communication is established, whether network transmission of the screen transition information is succeeded, and the like. If it is determined that transmission of the screen transition information is succeeded, the process proceeds to step 904.

In step 904, the CPU 225 determines whether the printing apparatus 300 receives the screen transition information, and whether the printing apparatus 300 was able to display a screen in accordance with the screen transition information. Specifically, the printing apparatus 300 receives the screen transition information and determines a screen to be displayed. The screen transition information "ROMversion" in FIG. 9 is equivalent to the current version confirmation screen 840 illustrated in FIG. 7E.

It is assumed that, if the screen transition information is transmitted in step 902, for example, the home screen 800 of FIG. 7A is displayed on the panel unit 305 of the printing apparatus 300. In this case, the printing apparatus 300 receives the screen transition information by the wireless LAN unit 307, transition to the current version confirmation screen 840 is instructed by the screen transition information, and the printing apparatus 300 changes the display screen into the current version confirmation screen 840.

If the current version confirmation screen 840 is displayed by the user instructing on the panel unit 305, the user presses the setup button 803 on the home screen 800, and makes the setup screen 810 in FIG. 7B be displayed. Then the user presses the printer setting button 811 to display the printer setting screen 820, and presses the firmware update button 821 to display the firmware update screen 830. When the user presses the current version confirmation button 831, the current version confirmation screen 840 may be displayed.

According to the present embodiment, when the printing apparatus 300 receives the screen transition information, and makes the screen transition, the printing apparatus 300 may skip the screen displays of 810, 820, and 830, and transition from the home screen 800 to the current version confirmation screen 840.

When the screen transitions to the current version confirmation screen 840, the printing apparatus 300 makes a response to the terminal device 200 representing that the screen transition has succeeded. If the printing apparatus 300 determines that screen transition is impossible, the printing apparatus 300 makes a response representing that the screen transition has failed. Cases where screen transition is impossible include, for example, a case where printing is being performed or where no corresponding screen exists.

In step 904, the CPU 225 of the terminal device 200 determines whether the response representing that the screen transition has succeeded is received from the printing apparatus 300 after the transmission of the screen transition information in step 902.

If no response representing a successful screen transition is received, the CPU 225 terminates the screen transition instruction program. Cases where no response representing a successful screen transition is received include, for example, a case where the wireless LAN unit 202 is invalid in the setup of the terminal device 200, and a case where the current printer is not connected, causing communication timeout, and no screen transition information is received from the current printer. Further, if the response representing that the screen transition has failed is received from the printing apparatus 300 as described above, it is also determined that no response representing a successful screen transition is received.

If the CPU 225 determines that the response representing that a successful screen transition is received from the current printer in step 904, the process proceeds to step 905.

If a response representing that the screen transition to the current version confirmation screen 840 has succeeded is received from the current printer, the CPU 225 automatically displays a manual page for successful screen transition described later in FIG. 10B, and terminates the screen transition instruction program. If the screen transitions automatically in the printing apparatus 300 by the process in step 902, it is not necessary to notify the user of the procedure for the user to manually display the screen to transition by the screen transition information. Therefore, in step 905, the CPU 225 performs display control for making a screen corresponding to the screen transition information be displayed on the panel unit 204. On that screen, the procedure for the user to manually display the screen to transition by the screen transition information is omitted. In this manner, the terminal device 200 may change the display content in the printing apparatus 300 and change the screen with its own display content into a screen with the corresponding change.

FIGS. 10A to 10C illustrate the display of the terminal device 200 when the terminal device 200 performs screen transition automatically under the screen transition instruction program. FIG. 10A is a default manual page of the confirmation method of the ROM version of the printer. The screen illustrated in FIG. 10A is displayed when the process by the screen transition instruction program as illustrated in FIG. 8 is not performed, or when the response representing that the screen transition has succeeded is not received.

The screen illustrated in FIG. 10B is a display screen of the terminal device 200 when the web page is changed in the process in step 905. In step 905, since it is confirmed that automatic screen transition in the printing apparatus 300 succeeds in step 904, it is not necessary to display the procedure to manually display the transitioned screen. Therefore, in a ROM version confirmation method 1100 in FIG. 10B, the procedure steps 1 to 5 illustrated in FIG. 10A are skipped.

If the screen illustrated in FIG. 10A is displayed in the terminal device 200 although the automatic screen transition is performed in the printing apparatus 300, the user is not able to recognize that the screen has transitioned and may try to perform the procedure steps 1 to 5 of FIG. 10A. To avoid this problem, the terminal device 200 automatically displays the screen illustrated in FIG. 10B in step 905. Then, it may be avoided that the user performs the procedure steps 1 to 5 of FIG. 10A and it is possible to properly notify the user of the procedure step 1 in FIG. 10B.

In step 905, the CPU 225 makes the web page corresponding to the screen transition information acquired in step 900 and transmitted to the printing apparatus 300 in step 902 as described above be displayed on the panel unit 204. Therefore, if, for example, the screen transition information corresponds to information for the printer setting screen illustrated in FIG. 10C, the printer setting screen is automatically displayed upon reception of the screen transition information in the printing apparatus 300. At the same time, the screen corresponding to the procedure steps 4 to 6 of the web manual illustrated in FIG. 10A is displayed on the panel unit 204 of the terminal device 200.

In the flowchart illustrated in FIG. 8, the CPU 225 may display the screen illustrated in FIG. 10A in step 900, or may display the screen illustrated in FIG. 10A if the process in step 905 is not performed. In the former case, when the process in step 905 is performed, the screen displayed in the terminal device 200 transitions automatically to the screen illustrated in FIG. 10B from the screen illustrated in FIG. 10A. In this case, the user may recognize easily that the screen has transitioned automatically in the printing apparatus 300. In the latter case, when the user presses the link button 515 in FIG. 5B, the screen illustrated in FIG. 10A or FIG. 10B is displayed. If the screen of FIG. 10B is displayed, the user may recognize the procedure of FIG. 10B without being conscious of the procedure steps 1 to 5 in the screen illustrated in FIG. 10A.

In step 905 of FIG. 8, the CPU 225 generates a URL for displaying the screen illustrated in FIG. 10B by changing the URL corresponding to the link button 515 in FIG. 5B (the URL for displaying the screen illustrated in FIG. 10A). The CPU 225 accesses the generated URL by the web browsing function provided in the print application, and newly acquires an HTML document corresponding to the screen illustrated in FIG. 10B. The screen illustrated in FIG. 10B in accordance with the newly acquired HTML document is displayed. The thus changed URL is displayed in the URL display area 511 in FIG. 10B. In the example of FIG. 10B, the numerical "2" is added to the URL of the default page of FIG. 10A as a rule of generation of URL corresponding to the screen of FIG. 10B, but this example is not restrictive.

In the foregoing description, the screen illustrated in FIG. 10B is displayed without displaying the screen of FIG. 10A or transitions automatically from the screen of FIG. 10A, but this example is not restrictive. For example, the screen illustrated in FIG. 10C may be displayed when a scroll position in the web page or a predetermined part in the web page in the screen illustrated in FIG. 10A is designated in the screen transition information 1001 and the CPU 225 analyzes these pieces of information by the web browsing function. In FIG. 10C, the portion of the procedure steps 1 to 5 is scrolled automatically in order to manually display the screen illustrated in FIG. 7E in the printing apparatus 300, and the content corresponding to the ROM version confirmation method 1100 of FIG. 10B is displayed. This method provides the same effects as those of the case where the screen illustrated in FIG. 10B is displayed. Also in a case where the screen is scrolled automatically as illustrated in FIG. 10C, the screen illustrated in FIG. 10A may be displayed in step 900 as in the case of FIG. 10B, or may not be displayed. In the former case, since the user may view the automatic scrolling, the user may recognize that the screen has been scrolled. In the latter case, the user may recognize the required procedure step 6 without being conscious of the procedure steps 1 to 5.

Second Embodiment

In the first embodiment, transmission and reception of the screen transition information and transmission and reception of the response thereto are performed by the terminal device 200 and the printing apparatus 300 using the wireless LAN unit 202 and the wireless LAN unit 307 via the wireless LAN. In the second embodiment, an example in which screen transition information is transmitted and received by short-range wireless communication is described. Description is omitted about the same processes as those of the first embodiment.

Figure 11:
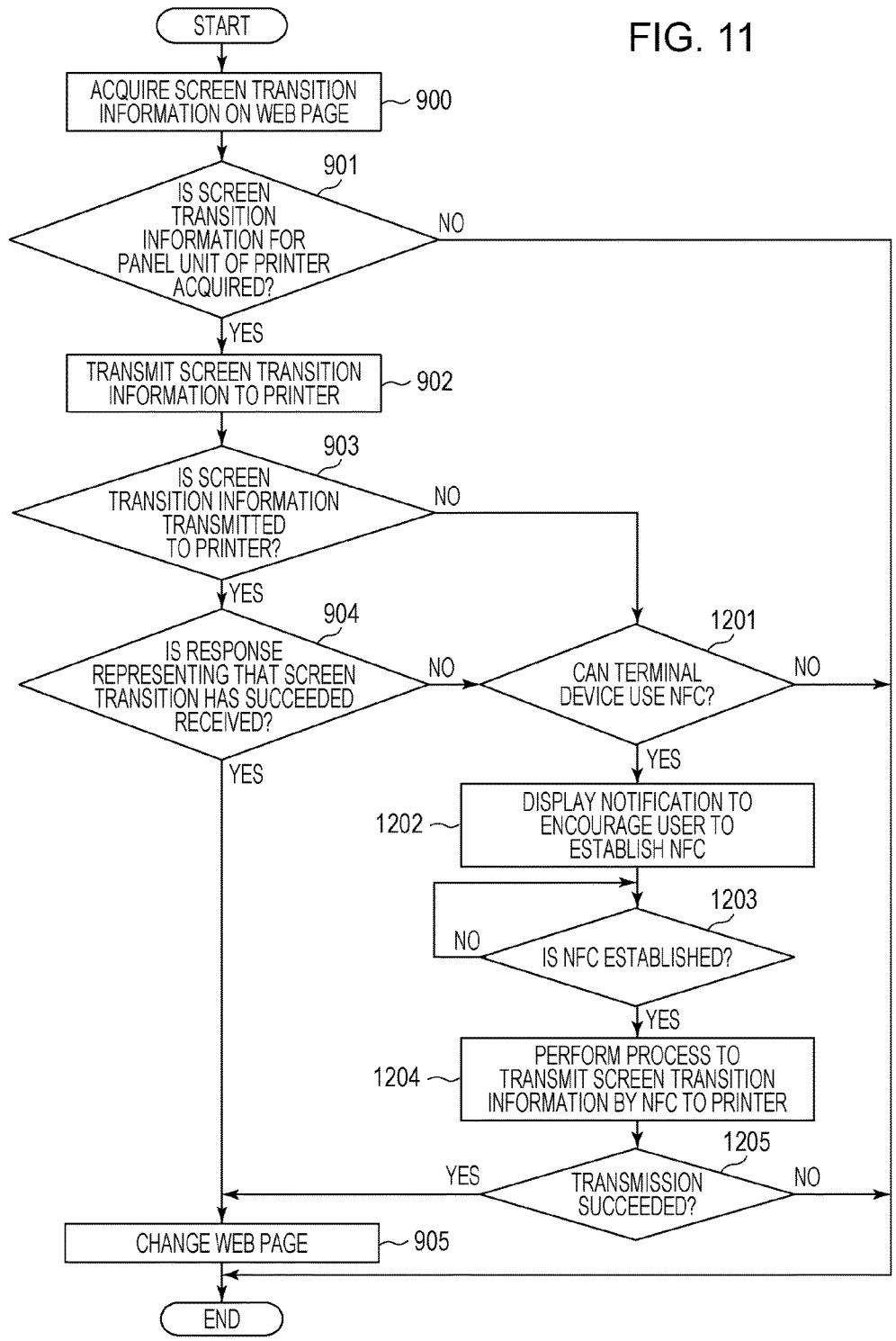
FIG. 11 illustrates a process of a screen transition instruction program executed in a web browsing function of a print application in a second embodiment.

FIG. 11 illustrates a process of a screen transition instruction program executed in a web browsing function of a print application in a second embodiment. As in the process illustrated in FIG. 8, the process illustrated in FIG. 11 is implemented when a CPU 225 executes, on data memory 227, the print application in program memory 226. The process illustrated in FIG. 11 is performed, as in the process illustrated in FIG. 8, after any of the buttons 512 to 515 is selected by the user in the screen illustrated in FIG. 5B and the CPU 225 acquires a document which supports the web page (e.g., an HTML document).

Steps 900 to 904 of FIG. 11 are the same as the processes described in FIG. 8 and thus are not described. If it is determined that screen transition information is not able to be transmitted to a printing apparatus 300 in step 903, or if it is determined that no response representing that the screen transition has succeeded is obtained from the printing apparatus 300 in step 904, the CPU 225 proceeds the process to step 1201. In step 1201, the CPU 225 determines whether the terminal device 200 is capable of communicating by a short-range wireless communication function of an NFC unit 201. If the terminal device 200 is capable of communicating by the short-range wireless communication function, the CPU 225 terminates the screen transition instruction program. If the terminal device 200 is capable of communicating by the short-range wireless communication function, the CPU 225 proceeds the process to step 1202. In step 1202, the CPU 225 displays a UI for encouraging the user to bring the NFC unit 201 of the terminal device 200 closer to an NFC unit 306 of the printing apparatus 300 (NFC touch).

Figure 12:
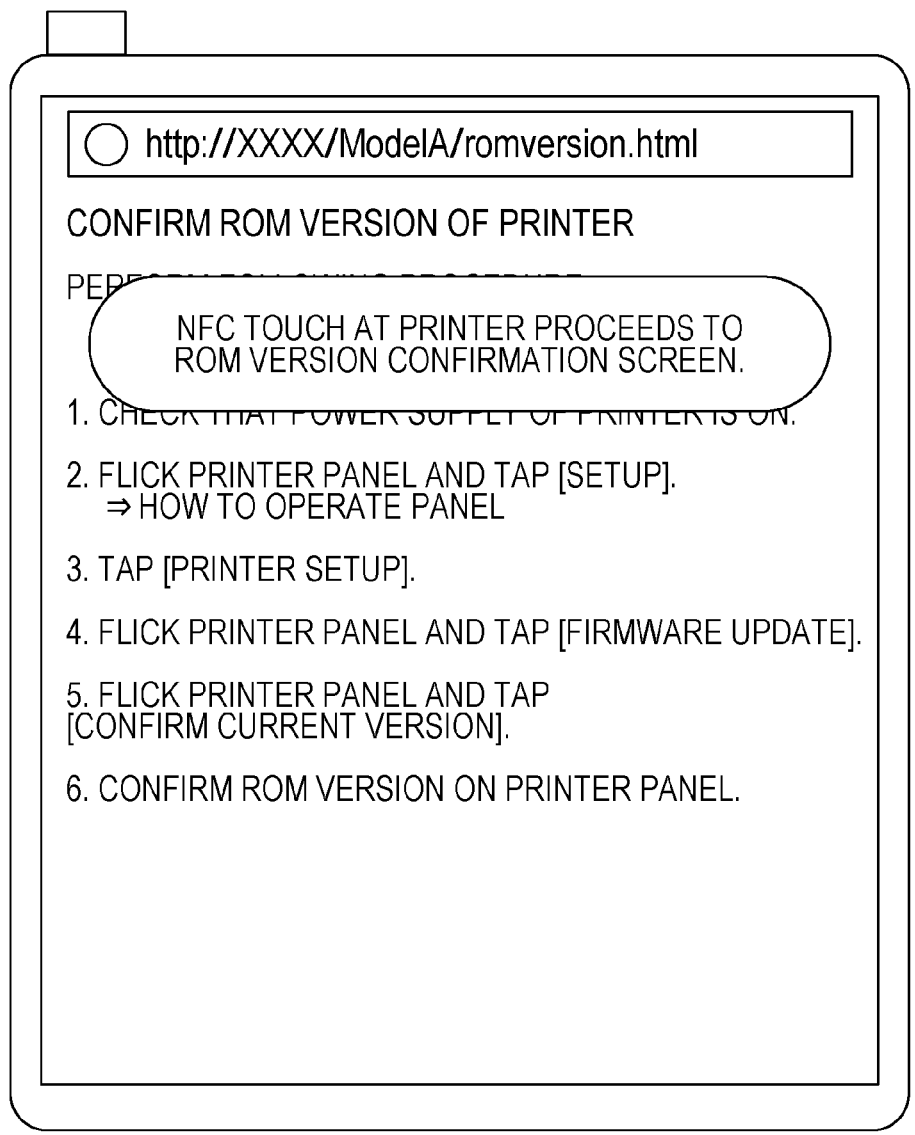
FIG. 12 illustrates exemplary display which encourages a user to perform near field wireless communication.

FIG. 12 illustrates a display example for encouraging the user to perform short-range wireless communication in step 1202. A message for encouraging NFC touch is displayed as a toast pop-up on the web browser. The method for encouraging NFC touch is not limited to the same, and the terminal device 200 may produce sound, or the printing apparatus 300 may display a message to encourage the user to bring the terminal device 200 closer to the panel unit 305. In step 1202, the CPU 225 encourages the user to perform NFC touch and proceeds the process to step 1203.

In step 1203, the CPU 225 checks periodically whether the short-range wireless communication with the printing apparatus 300 is established by an NFC control circuit 221 of the terminal device 200.

If the CPU 225 determines that the short-range wireless communication is established in step 1203, the process is proceeded to step 1204. In step 1204, the CPU 225 transmits the screen transition information to the NFC unit 306 of the printing apparatus 300 via the NFC unit 201 of the terminal device 200. In step 1205, the CPU 225 checks whether the screen transition information is transmitted successfully. Specifically, the CPU 225 checks whether writing in the NFC unit 306 of the printing apparatus 300 has been performed successfully, but this example is not restrictive. For example, whether transmission in step 1204 has succeeded may be checked as follows: the printing apparatus 300 may write information representing whether screen transition has succeeded in the NFC unit 306, and the information is read by the NFC unit 201 of the terminal device 200.

If it is determined that transmission of the screen transition information is failed in step 1205, the CPU 225 terminates the screen transition instruction program. If it is determined that transmission of the screen transition information has succeeded in step 1205, the CPU 225 displays the screen illustrated in FIG. 10B or FIG. 10C in step 905.

According to the second embodiment, if the screen transition information is not able to be transmitted by the wireless LAN, the screen transition information may be transmitted by the short-range wireless communication as a substitute means. However, the short-range wireless communication is not necessarily used as a substitute means. That is, the terminal device 200 may transmit the screen transition information by the short-range wireless communication regardless of whether the wireless LAN can be used. For example, if the process illustrated in FIG. 11 is started and acquisition of the screen transition information is confirmed in step 901, processes of steps 902 to 904 of FIG. 11 may be omitted and processes after step 1201 may be performed. Even in this case, the user confirms the screen of FIG. 12 and, if automatic screen transition is desirable, the user brings the terminal device 200 closer to the printing apparatus 300. If, on the other hand, the user determines that automatic screen transition is unnecessary, desired display may be displayed by not bringing the terminal device 200 closer to the printing apparatus 300.

When the screen transition information is transmitted by the short-range wireless communication, the screen transition information may be transmitted by a handover process instead of NFC. Specifically, the NFC unit 201 of the terminal device 200 acquires connection information for connecting with the printing apparatus 300 by wireless LAN communication (e.g., an SSID of an access point to which the printing apparatus 300 is connected) from the NFC unit 306 of the printing apparatus 300. After the terminal device 200 establishes a connection of wireless LAN communication with the printing apparatus 300 using the connection information, communication screen transition information may be transmitted by the wireless LAN unit 202. The terminal device 200 may perform communication with the printing apparatus 300 by a USB connection or by a cable LAN instead of the short-range wireless communication.

The above-described handover process is performed by the print application. Specifically, when the CPU 225 executes the print application, the NFC unit 201 is made to acquire the connection information via the OS. The CPU 225 further executes the print application to transmit the screen transition information to the wireless LAN unit 202 and receive a response via the OS.

Third Embodiment

In a third embodiment, an example is described in which a terminal device 200 analyzes a document which supports a web page (e.g., an HTML document) to acquire conditions under which screen transition information is transmitted to a printing apparatus 300 and, if the conditions are satisfied, the screen transition information is transmitted to the printing apparatus 300. Description is omitted about the same processes as those of the first embodiment.

FIG. 13 illustrates a process of a screen transition instruction program in the third embodiment. As in the processes illustrated in FIGS. 8 and 11, the process illustrated in FIG. 13 is performed after any of the buttons 512 to 515 is selected by the user on the screen illustrated in FIG. 5B provided by a print application, and a CPU 225 acquires a document which supports a web page. Specifically, the process illustrated in FIG. 13 is performed when the CPU 225 executes, on data memory 227, a screen transition instruction program which is a part of the print application stored in program memory 226.

Processes in step 900 and step 901 are the same as those illustrated in FIG. 8. In step 900, a process to acquire a transmission condition of the screen transition information in addition to the screen transition information is performed. When the screen transition information is acquired, the CPU 225 performs the process in step 1402.

In step 1402, the CPU 225 determines whether the transmission condition of the screen transition information acquired in step 900 is to transmit at the time at which the web page of the HTML document analyzed in step 900 is displayed. This condition is the same as the transmission condition illustrated in FIG. 8, and the CPU 225 proceeds the process to step 902. The processes in steps 902 to 905 are the same as those in FIG. 8.

In step 1402, if it is determined that the transmission condition of the screen transition information is not to transmit at the time at which the web page is displayed, the CPU 225 proceeds the process to step 1403. In step 1403, the CPU 225 determines whether the transmission condition of the screen transition information is at the time at which a specific part in the web page (an element in the HTML) is displayed. FIG. 14 illustrates an exemplary HTML document in which display of a specific part in the web page is designated as a transmission condition of the screen transition information. In the example of FIG. 14, a keyword "PrinterPanel" indicating screen transition is in a tag of the title "ROM version confirmation of the printer." In this case, the transmission condition is designated such that the screen transition information is transmitted when this title is displayed on the web browser. As in the example illustrated in FIG. 9, if there is a keyword in a part representing the entire web page (e.g., an HTML tag), it is determined that the screen transitions at the time at which the web page itself is displayed on the web browser in step 1402.

In step 1403, if it is determined that the transmission condition of the screen transition information is at the time at which a specific part is displayed, the CPU 225 proceeds the process to step 1405. In step 1405, the CPU 225 periodically confirms by the web browsing function whether a specific part designated by the HTML document (the title herein) is displayed on the panel unit 204 of the terminal device 200 and, if determines that the specific part is displayed, proceeds the process to step 902.

According to the process in FIG. 13, the screen transition information is transmitted to the printing apparatus 300 from the terminal device 200 at the time at which the specific part in the web page is displayed. Therefore, the screen transitions automatically in the printing apparatus 300 at the time at which the specific part is displayed, and the screen illustrated in FIG. 10B or FIG. 10C is displayed in the terminal device 200.

For example, herein, the procedure steps 1 to 10 are described in the manual page as illustrated in FIG. 10A, a predetermined screen is displayed on the printing apparatus 300 by the procedure steps 1 to 9, and the user confirms the screen by the procedure step 10. In this case, if the screen does not transition about the procedure steps 1 to 3 and the display of the procedure steps 4 to 9 can be omitted as long as the screen transition automatically in the printing apparatus 300, the creator of the HTML document of the manual applies the screen transition information to the text tag corresponding to the procedure step 4. Therefore, in the terminal device 200, after the user confirms the procedure steps 1 to 3 and performs predetermined operations, and then the user makes the text of the procedure step 4 be displayed, the screen transitions automatically to the screen corresponding to the procedure step 10. In this manner, the screen may transition at appropriate timing.

However, if the text of the procedure step 4 is displayed before the user completes the procedure steps 1 to 3, the screen corresponding to the procedure step 10 can be displayed before required operations complete. Therefore, for example, before the transmission of the screen transition information, the terminal device 200 may perform display by the print application to encourage the user to confirm whether the procedure steps 1 to 3 have completed. Similarly, even if the transmission condition of the screen transition information is to display the entire web page, the screen which inquires to the user whether to perform automatic screen transition may be displayed before the transmission of the screen transition information.

The transmission conditions of the screen transition information are not limited to those described above. For example, display time of the web page is designated by the HTML document, and the screen transition information may be transmitted after designated time elapsed since the screen illustrated in FIG. 10A is displayed. As a method for specifying the specific part as the transmission condition, the same mounting is also possible by designating an ID of the specific part (e.g., a button) of the web page in the screen transition information.

Fourth Embodiment

In a fourth embodiment, an embodiment is described in which display by a print application of a terminal device 200 and display of a remote UI of a printing apparatus 300 displayed by the terminal device 200 are made to transition automatically. Description is omitted about the same processes as those of the first embodiment.

FIG. 15 illustrates an exemplary HTML document for implementing a process of the fourth embodiment. The printing apparatus 300 has a server function, and the terminal device 200 may access the printing apparatus 300 via a network from a web browser for the confirmation of the status of the printing apparatus 300 and various setting changes of the printing apparatus 300 (the remote UI).

In the example of FIG. 15, a keyword representing screen transition is "Web Browser." The terminal device 200 transmits screen transition information to the printing apparatus 300 including the keyword as in the process in step 902 of FIG. 8. As a response representing success from the printing apparatus 300, the terminal device 200 also receives a URL as access information for accessing the remote UI. Since the keyword is "ROMversion," the printing apparatus 300 transmits a URL corresponding to the current version confirmation screen (the URL of the remote UI). Since the keyword is "Web Browser," the terminal device 200 determines to display the remote UI on a panel unit 204 of the terminal device 200. In accordance with the URL received as the response of the printing apparatus 300, the remote UI representing the current version confirmation screen is displayed on the web browser.

Further, the terminal device 200 displays a web page (a web manual) in accordance with an HTML document illustrated in FIG. 15 based on the response from the printing apparatus 300. Specifically, the terminal device 200 makes the web manual transition automatically by the same process as that in step 905 of FIG. 8. In this manner, a manual corresponding to the procedure to make the user confirm the current version confirmation screen displayed on the remote UI is displayed.

Figure 16:
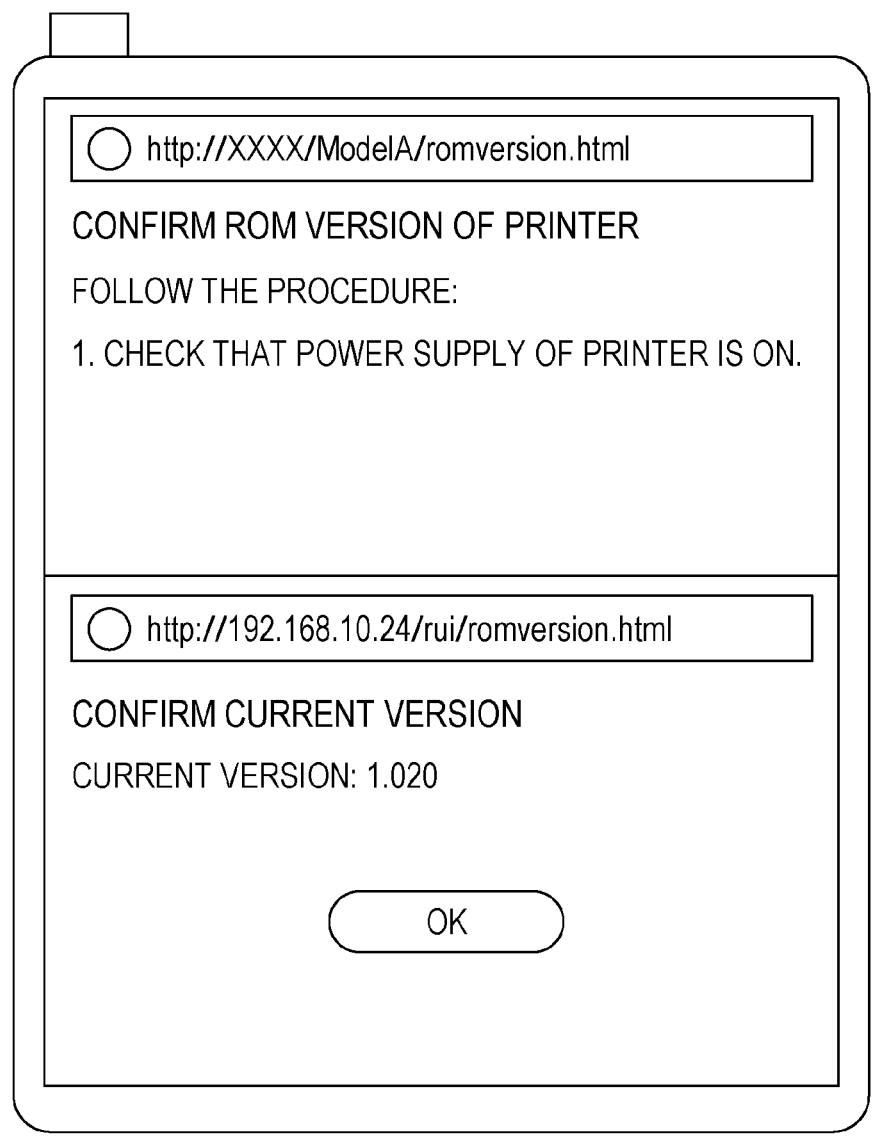
FIG. 16 illustrates exemplary display in a case where a remote UI and a web manual are displayed in parallel.

In the fourth embodiment, the terminal device 200 displays both the remote UI and the web manual described above on the web browser. FIG. 16 illustrates exemplary display in a case where the remote UI and the web manual are displayed in parallel.

According to the fourth embodiment, the web manual and the remote UI are updated automatically and are displayed in parallel. Therefore, the user may confirm the procedure to be performed then and the remote UI corresponding to the procedure quickly and easily by confirming the panel unit 204 of the terminal device 200.

The method by which the terminal device 200 acquires the URL of the remote UI is not limited to the example described above. For example, the terminal device 200 may generate, by the web browsing function, the URL of the remote UI for displaying the ROM version of the printing apparatus 300.

Fifth Embodiment

In a fifth embodiment, an embodiment is described in which a user operates a panel unit 305 of a printing apparatus 300 to transition a screen, followed by a change in a web page of a terminal device 200. Specifically, a case in which after the terminal device 200 transmits screen transition information and a screen of the printing apparatus 300 transitions automatically, the user operates, for example, the panel unit 305 of the printing apparatus 300 to further transition the screen to a different screen is described. Description is omitted about the same processes as those of the first embodiment.

Figure 17:
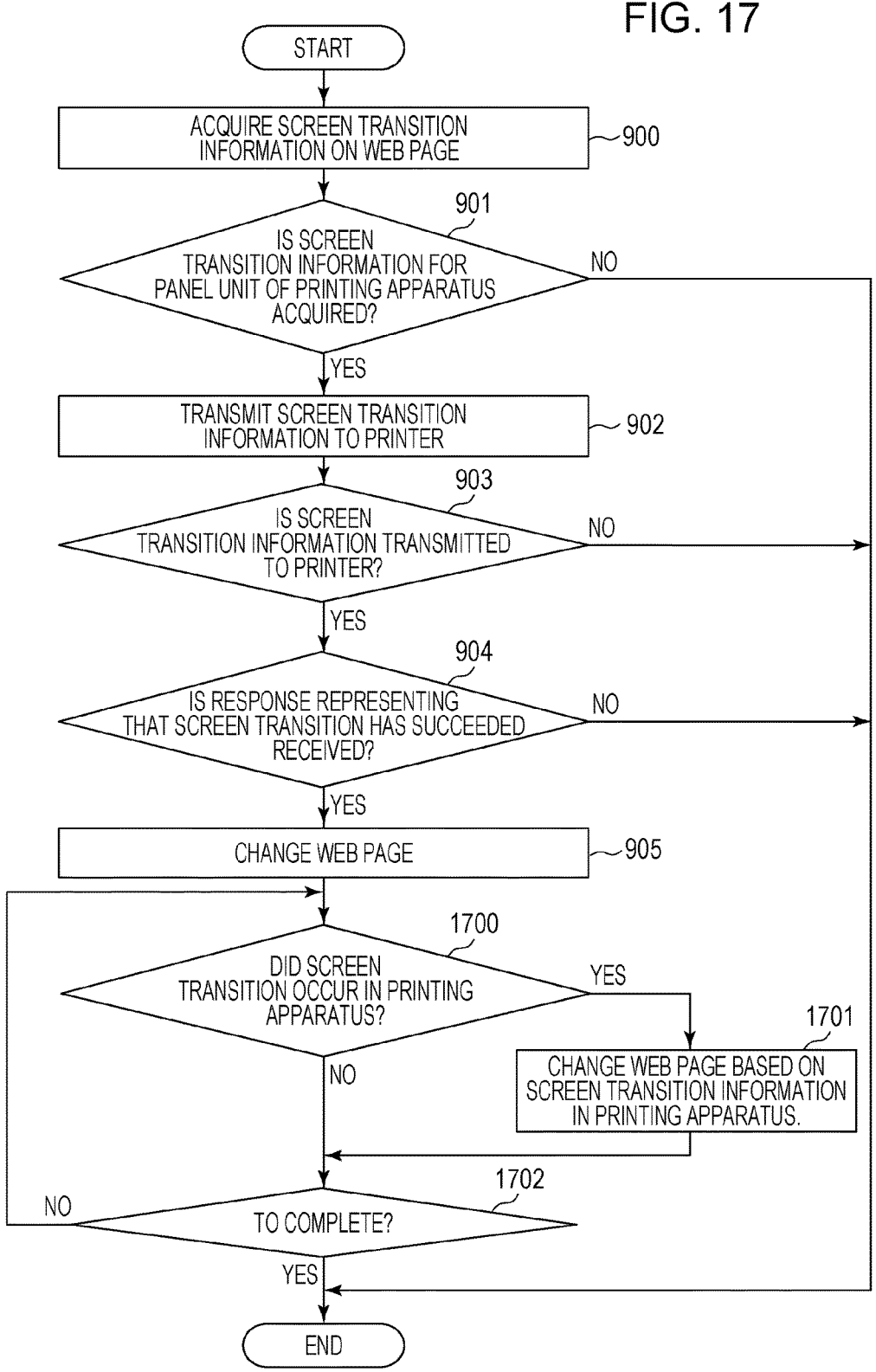
FIG. 17 illustrates a process of a screen transition instruction program in a fifth embodiment.

FIG. 17 illustrates a process of a screen transition instruction program in the fifth embodiment.

When a screen transitions automatically to a manual page used when the screen transition succeeds (e.g., the page illustrated in FIG. 10B) by the process in step 905, the process proceeds to step 1700. A CPU 225 acquires a display status of the panel unit 305 of the printing apparatus 300 periodically in step 1700. As an exemplary acquisition method, the terminal device 200 requests acquisition of the screen transition information on the panel unit 305 to the printing apparatus 300, and the printing apparatus 300 returns the screen transition information to the terminal device 200 in response to the request. If the CPU 225 determines that screen transition has occurred in the printing apparatus 300 in step 1700, the process proceeds to step 1701.

In step 1701, the CPU 225 changes the web page in accordance with the screen transition information acquired from the printing apparatus 300. As in the screen transition information illustrated in FIG. 9, the screen transition information transmitted from the printing apparatus 300 includes a keyword representing a screen of transition destination. Therefore, the CPU 225 makes the screen transition automatically to a screen in accordance with the keyword (e.g., a web manual) in step 1701.

If the web page is changed in step 1701, the CPU 225 confirms whether the screen transition instruction program is to be terminated in step 1702. Specifically, it is determined that the screen transition instruction program is to be terminated if the web page displayed on the terminal device 200 is changed by the user operation on the terminal device 200 or if a print application is terminated in the terminal device 200. Further, it is determined that the screen transition instruction program is to be terminated when communication becomes impossible due to, for example, turning-off of the printing apparatus 300. The CPU 225 terminates the screen transition instruction program if it is determined that the screen transition instruction program is to be terminated. If it is determined not to terminate the screen transition instruction program, the process proceeds to step 1700.

As described above, when the terminal device 200 acquires the screen transition information from the printing apparatus 300, the terminal device 200 may display an appropriate web page corresponding to the screen transition even if, for example, the user makes the screen transition on the panel unit 305 of the printing apparatus 300.

Although the print application performs a process about automatic screen transition to a single current printer in the foregoing embodiments, this example is not restrictive. For example, instructions about automatic screen transition described above may be issued to a plurality of printers registered to the terminal device 200. Although the terminal device 200 transmits a screen transition instruction to the printing apparatus 300 automatically by the screen transition instruction program upon acquisition of the document in which the screen transition information is included (e.g., the HTML document), this example is not restrictive. For example, the terminal device 200 may display a confirmation screen to the user on the panel unit 204 and transmit the screen transition instruction after obtaining confirmation by the user.

In the foregoing embodiments, the screen transition instruction program as the display control program is included in the print application. However, this example is not restrictive and the screen transition instruction program may be incorporated as a part of the web browser stored in the terminal device 200, or may be installed in the terminal device 200 as a display control application and as a program independent of other applications.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A program code for implementing the function of the present embodiment may be executed by one computer (CPU, MPU) or may be executed by a plurality of computers in cooperation. The program code may be executed by a computer. Alternatively, hardware, such as a circuit, for implementing the function of the program code may be provided. Alternatively, a part of the program code may be implemented by hardware, and the computer may perform the rest of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140580, filed Jul. 14, 2015, which is hereby incorporated by reference herein in its entirety.

What is claimed is:

1. A display control method implemented in a display control apparatus which includes a display device and is capable of communicating with a predetermined device, the method comprising:
   displaying a first predetermined screen in which a predetermined display item is included;
   acquiring data which corresponds to a web page and includes change information for changing display provided by the predetermined device, in a case where the predetermined display item is designated by a user;
   transmitting the change information included in the acquired data to the predetermined device from the display control apparatus;
   receiving a predetermined response which is transmitted from the predetermined device based on the display provided by the predetermined device being changed by the change information;
   displaying, in a case where the predetermined response is received, a second predetermined screen corresponding to another web page and the display provided by the predetermined device, instead of the first predetermined screen; and
   displaying, in a case where the predetermined response is not received, a third predetermined screen based on the acquired data corresponding to the web page, instead of the first predetermined screen.

2. The display control method according to claim 1, further comprising:
   determining whether the change information is included in the acquired data;
   the change information is transmitted to the predetermined device from the display control apparatus, in a case where it is determined that the change information is included in the acquired data,
   wherein the third predetermined screen is further displayed in a case where it is determined that the change information is not included in the acquired data.

3. The display control method according to claim 1, wherein the third predetermined screen is displayed instead of the first predetermined screen, and
   in a case where the predetermined response is received, the second predetermined screen is displayed instead of the third predetermined screen.

4. The display control method according to claim 1, wherein
   scrolling, by the display control apparatus, such that a portion corresponding to the second predetermined screen is displayed.

5. The display control method according to claim 1, wherein
   the display control apparatus communicates with the predetermined device by a wireless LAN, and
   the display control apparatus transmits the change information via the wireless LAN.

6. The display control method according to claim 1, wherein
the display control apparatus communicates with the predetermined device by short-range wireless communication and a communication method of which communication range is wider than that of the short-range wireless communication, and
the display control apparatus transmits the change information via a wireless LAN connection between the display control apparatus and the predetermined device which are connected based on communication between the display control apparatus and the predetermined device by the short-range wireless communication.

7. The display control method according to claim 1, wherein the data is for the display of a web page.

8. The display control method according to claim 1, further comprising:
displaying an inquiry screen for inquiring of the user whether to perform automatic screen transition on the display device.

9. The display control method according to claim 1, wherein in the acquiring, the data is acquired by accessing the web page using access information corresponding to the predetermined display item.

10. The display control method according to claim 9, wherein the access information is a URL.

11. The display control method according to claim 9, further comprising:
generating second access information by changing the access information; and
acquiring second data by access using the generated second access information,
wherein the second predetermined is displayed based on the acquired second data.

12. The display control method according to claim 11, wherein the data and the second data are HTML documents.

13. The display control method according to claim 11, wherein the access information and the second access information are URLs.

14. The display control method according to claim 1, wherein the data is an HTML document.

15. The display control method according to claim 1, wherein the predetermined device is a printing apparatus that prints an image on a print medium.

16. A non-transitory storage medium storing a set of instructions, that when executed by a processor, executes a display control method for a display control apparatus which includes a display device and which is capable of communicating with a predetermined device, the display control method comprising:
displaying a first predetermined screen in which a predetermined display item is included;
acquiring data which corresponds to a web page and includes change information for changing display provided by the predetermined device, in a case where the predetermined display item is designated by a user;
transmitting the change information included in the acquired data to the predetermined device from the display control apparatus;
receiving a predetermined response which is transmitted from the predetermined device based on the display provided by the predetermined device being changed by the change information;
displaying, in case where the predetermined response is received, a second predetermined screen corresponding to another web page and the display provided by the predetermined device, instead of the first predetermined screen; and
displaying, in a case where the predetermined response is not received, a third predetermined screen based on the acquired data corresponding to the web page, instead of the first predetermined screen.

17. A display control apparatus which includes a display device and is capable of communicating with a predetermined device, comprising:
a display unit configured to display a first predetermined screen in which a predetermined display item is included;
an acquisition unit configured to acquire data which corresponds to a web page and includes change information for changing display provided by the predetermined device, in a case where the predetermined display item is designated by a user;
a transmission unit configured to transmit the change information included in the acquired data to the predetermined device from the display control apparatus;
a receiving unit configured to receive a predetermined response which is transmitted from the predetermined device based on the display provided by the predetermined device being changed by the change information; and
a display control unit configured to
display, in case where the predetermined response is received, a second predetermined screen corresponding to another web page and the display provided by the predetermined device, instead of the first predetermined screen and
display, in a case where the predetermined response is not received, a third predetermined screen based on the acquired data corresponding to the web page, instead of the first predetermined screen.

* * * * *